Nov. 26, 1929.　　J. F. BURCH ET AL　　1,737,450
FISHING CREEL
Filed June 8, 1928　　2 Sheets-Sheet 1
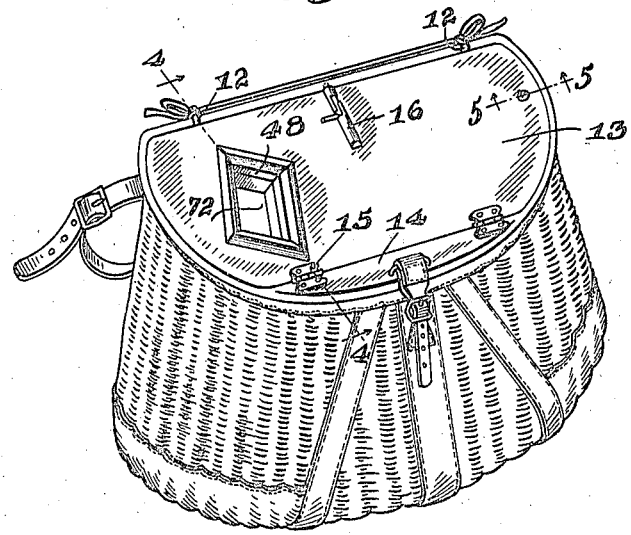
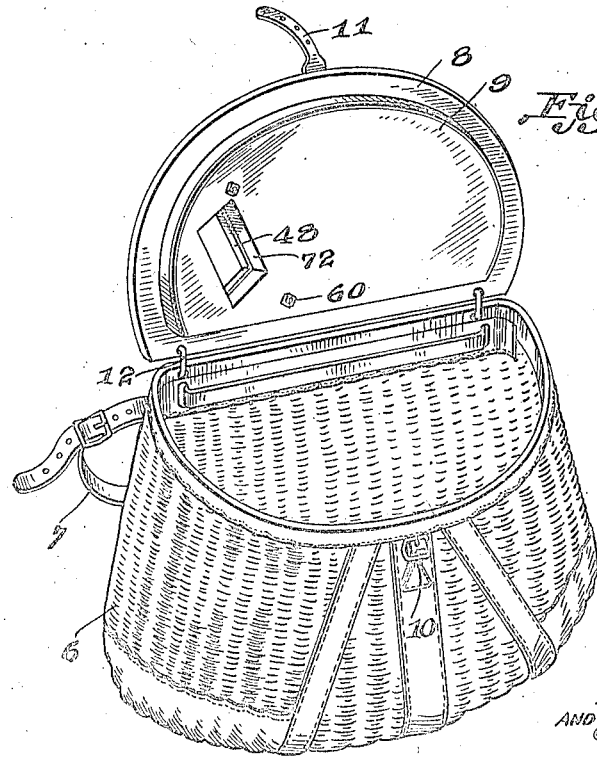
Inventors
A. H. Morton
AND J. F. Burch
By Wilkinson & Ginsta
Attorneys Nov. 26, 1929.　　　J. F. BURCH ET AL　　　1,737,450
FISHING CREEL
Filed June 8, 1928　　　2 Sheets-Sheet 2
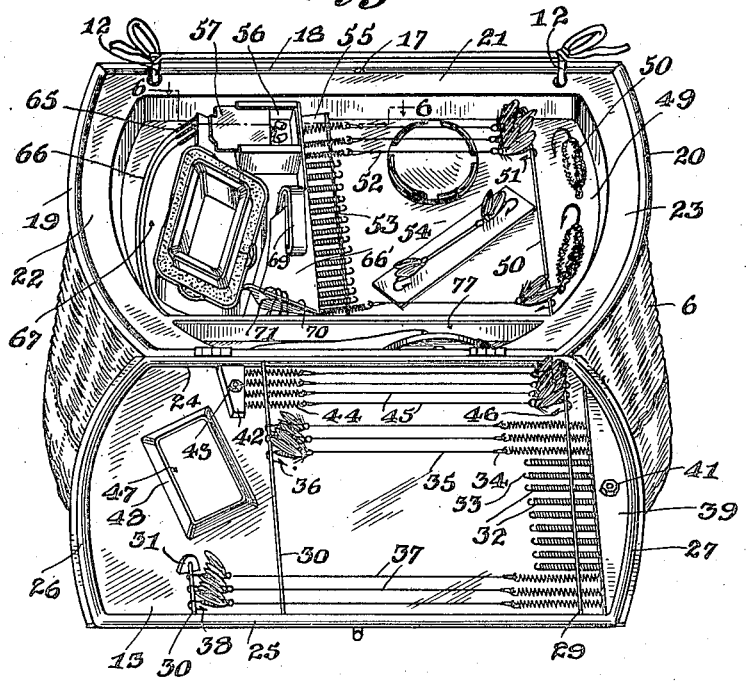
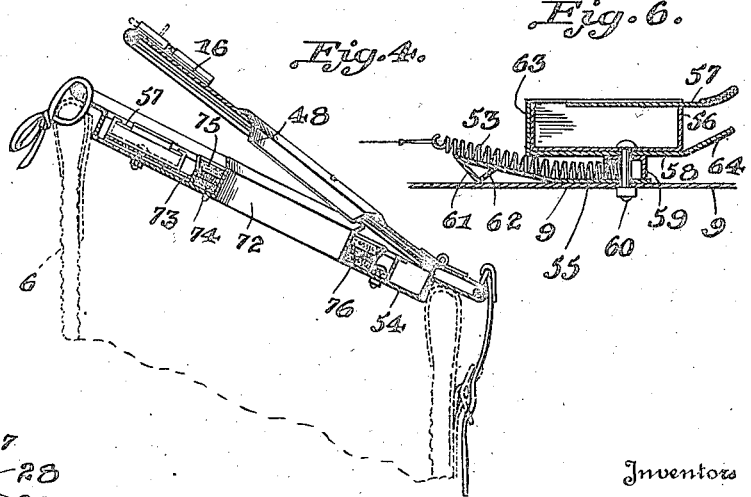
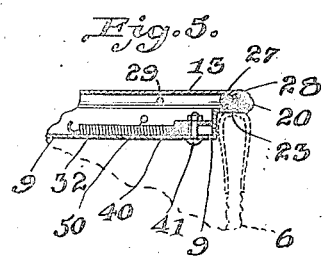
Inventors
A. H. Morton
AND J. F. Burch
By Wilkinson & Ginsta
Attorney Patented Nov. 26, 1929

1,737,450

UNITED STATES PATENT OFFICE

JOHN FREDERICK BURCH AND ARNOLD HARRISON MORTON, OF BILLINGS, MONTANA

FISHING CREEL

Application filed June 8, 1928. Serial No. 283,973.

The present invention relates to improvements in fishing creels, and has for an object to provide a combination fish basket and tackle container.

Another object of the invention resides in providing an improved fishing basket and cover, which latter is provided with a compartment for holding fish hooks, lines and other forms of tackle, ready at hand, whereby the fisherman will not be obliged to pack and carry his tackle as an additional part of the equipment.

A further object of the invention resides in providing an improved form of cover for a fish basket in which the fishing tackle will be held against tangling and in a.. orderly way, such as will admit of its being readily selected and removed.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of an improved fishing creel and tackle container constructed according to the present invention.

Figure 2 is a similar view with the cover in raised position.

Figure 3 is also a perspective view with the lid of the cover compartment thrown open.

Figure 4 is a cross section taken through the cover on the line 4—4 in Figure 1 with the lid partly raised.

Figure 5 is a section taken on the line 5—5 in Figure 1, and

Figure 6 is a section taken on the line 6—6 in Figure 3.

Referring more particularly to the drawings 6 designates a fish basket or creel of a usual construction having the strap 7 by which it may be slung over the shoulder. The cover for the basket is represented generally at 8 and is preferably of metal having a depressed portion 9 serving to form a compartment within the cover for receiving the tackle equipment.

This depressed portion 9 also functions as a flange, as indicated in Figure 4, to enter the mouth of the wicker basket in order to center the cover and basket and to form a tight fit therebetween. A buckle 10 upon the basket is adapted to receive the strap 11 upon the cover for the purpose of securing the cover in the closed position. The cover is hinged to the basket by the tape or strap hinges 12.

The compartment within the depressed portion of the cover is adapted to be closed by a lid 13, which constitutes the major upper portion of the cover except for the fixed piece 14 which secures the hinges 15 about which the lid 13 is adapted to open and close. A latch 16 on the lid is adapted to cooperate with an opening 17 in the rim 18 of the cover for the purpose of holding the lid in place on the compartment. The rim 18 has lateral portions 19 and 20 which rise up a distance from the front and side ledges 21, 22, and 23 upon which the lid 13 rests when in the closed position. The lid is also provided with the front and rear rims or upstanding beads 24 and 25 and the side beads or rims 26 and 27 which serve to form a cavity within the lid, as shown in Figure 3.

Outwardly of the rims 26 and 27 are the flanges 28 for engaging upon the beads 19 and 20, as shown in Figure 5, and thus making a tight joint.

Within the lid 13, as shown in Figure 3, are the rods or bars 29 and 30 mounted in spaced relation and extending the full width of the lid. There is also a smaller rod or bar 30, which extends only part way across the lid and has a bearing 31 soldered or otherwise secured to the lid. The other rods may be fitted at their ends in the beads or rims 24 and 25. A row of small coil springs 32 are shown beneath the rod 29. Each coil spring is provided at its free end with an open catch 33 to receive a loop 34 at the end of a leader 35. The fish hooks 36, whether they be plain or fly hooks, are engaged over the bar 30.

In Figure 3 three of the hooks 36 are shown as engaging the bar 30, the attached coil springs 32 being distended so that the leaders 35 are drawn taut. Thus the hooks and leaders will be held against entanglement and may be readily removed by first slipping the hook 36 off the bar 30 and then allowing the coil spring 32 to subside to its normal contracted position; whereupon the loop 30 may be disengaged from the bill 33 of the coil spring.

Where longer leaders 37 are employed, the connected fish hooks 38 may be engaged over the rod 30 which is situated further from the row of coil springs 32. The coil springs are held in place by a clamp bar 39, shown in Figures 3 and 5 having the downturned flange 40 for engaging through certain convolutions of the springs near the ends thereof and serving to clamp the springs tightly in place.

The clamp bar 39 is held in place by a single bolt 41, its engagement with the rim 27 serving to prevent its rotation about the single bolt 41. By removing this bolt or other fastening 41, the entire clamp bar 39 may be removed to free all of the springs 32 at once.

A somewhat similar form of clamp bar 42 is shown as secured to the lid near one end of the rod 30, a bolt or other fastening 43 being employed for the purpose. The row of coil springs 44 held by this clamp bar 42 are arranged to receive the leaders 45 of the fish hooks 46 which engage about the rod 29. The lid 13 is provided with an opening 47 therethrough having the in-turned flange 48.

Referring more particularly to the receptacle in the cover, a space 49 is shown to the right in Figure 3 for receiving the artificial mice or other lure. This space 49 is to one side of a rod 50 for attaching the fish hooks 51 having the leaders 52. Such leaders are connected with the coil springs 53 held in a bank in the central portion of the compartment. Between the springs 53 and the rod 50 is a space 54 for receiving lines, and other pieces of tackle, which will not become tangled with fly hooks extending across them. The springs 53 are placed upon a strip 55 for the purpose of elevating the springs to the proper height. A sinker box is shown at 56 having a sliding lid 57. This box may contain shot or sinkers of different kinds.

As shown in Figures 3 and 6, the box 56 is shown as resting upon a plate 58. This plate 58 overlies the strip 55 or a part of it and is supported by a channel rail 59 of inverted U form which rests directly upon the strip 55. The strip 55 engages with certain convolutions of the springs 53 for the purpose of holding the springs in position. A bolt or other fastening 60 is inserted through the bottom of the box 56, the plate 58, the rail 59, strip 55 and the base member 9 of the cover for holding all of the parts together. The strip 55 extends outwardly and upwardly from one edge of the box 56 and has its outer edge terminating short of the hooks on the springs 53. The outer upturned edge of the strip is held in the position shown by an easel support made of the bent leg portions 61 and 62 from the material of the strip itself.

The plate 58 is provided with an upstanding flange 63 along one edge thereof and at one end portion of its opposite edge adjacent the box with a diagonally upturned portion 64 to form a space under which hooks 65 may be inserted, the leaders 66 from the hooks being laid in a space 67. The flange 63 at one portion is provided with a ledge 68 bent backwardly and downwardly toward the plate 58 to confine a space which is open at one end toward the box 56 for the purpose of carrying lead strips 69 or other articles of the kind. The ledge 68 is provided at one end with an upstanding abutment 70 for receiving the hooks 71, the leaders of which may extend about in the space 67.

Referring more particularly to Figures 3 and 4, the flange 48 of the lid is adapted to cooperate with a flange 72 of the cover. The flange 48 fits within the flange 72, both flanges having diagonally turned contacting portions whereby to form an opening through the lid of the box for the passage of fish of ordinary size. The flange 72 is surrounded by a flange 73 forming an annular space between the flanges to receive the felt strips 74 and 75 containing between them the leaders 76. The felt strip on top may be moistened so that the leaders will be ready for use. By removing the top strip, the leaders may easily be lifted out. A longitudinal partition 77 in the cover provides a compartment for receiving tools apt to be used in this connection. The lid 13 may be provided with a suitable lock that will not catch on the clothing in order to protect the valuable tackle from theft. It will not be necessary to lift the cover except rarely as the opening through the cover will receive the average size fish. The lid of the container will be water and dust proof to protect the tackle.

The lid opens away from the body of the person carrying the creel so that it becomes an easy matter to select the tackle without removing the basket.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved fishing creel comprising a container for the fish, a cover for the container, a lid for the cover, said cover and lid having an opening therethrough, and inter-engaging flanges about the opening, said cover having a second flange extending in spaced relation about the flange in the cover for forming an annular space to receive felt strips.

2. A fishing creel comprising a container, a hollow cover for the container, a lid for giving access to the hollow cover, a rod in the hollow cover for receiving fish hooks, a row of coil springs arranged side by side opposite said rod and having hooks thereon for engaging in the loops of the leaders of said fish hooks, and a clamp bar for securing said row of coil springs in place having a part for fitting down between certain convolutions of the springs.

3. A fishing creel comprising a container, a cover for the container having a compartment therein, a lid for the compartment, a rod in the compartment for receiving fish hooks, a row of coil springs disposed side by side opposite said rod and having means to engage in the loops of the leaders of said fish hooks, a clamp bar having a portion for entering certain convolutions of the springs to hold the springs in place, and a strip extending along beneath said springs and having an end thereof turned up to support the portions of the spring toward said rod on an inclination.

4. A fishing creel comprising a container, a cover for the container having a compartment therein, a lid for the compartment, a rod in the compartment for receiving fish hooks, a row of coil springs disposed side by side opposite said rod and having means to engage in the loops of the leaders of said fish hooks, a clamp bar having a portion for entering certain convolutions of the springs to hold the springs in place, and a strip placed beneath the springs and having one end portion upturned with a terminal part bent under the upwardly turned end and bent into substantially V-shape to form an easel support.

ARNOLD HARRISON MORTON.
JOHN FREDERICK BURCH.